May 5, 1936.                O. L. WENDEROTH                2,039,574
CONTAINER HANDLE
Filed Oct. 30, 1935

Inventor
Osmund L. Wenderoth,
By Herbert M. Birch
Attorney

UNITED STATES PATENT OFFICE 2,039,574

CONTAINER HANDLE

Osmund L. Wenderoth, Baltimore, Md.

Application October 30, 1935, Serial No. 47,491

2 Claims. (Cl. 220—94)

This invention relates to cooking utensils and the method of making them from sheet material. More particularly this invention relates to a pan for baking cookies, which is cheap to make, highly efficient and very durable.

An object of my invention is to provide a novel handle for a bake pan or tray.

Another object of my invention is to teach a novel and highly efficient method of forming a handle.

Still another object of my invention is to provide a handle for a cookie pan of the type which is adapted to be slid into the oven of a domestic cook stove in place of the usual oven shelves or grids.

My invention and its application is best understood by reference to the accompanying drawing as follows.

Figure 1:
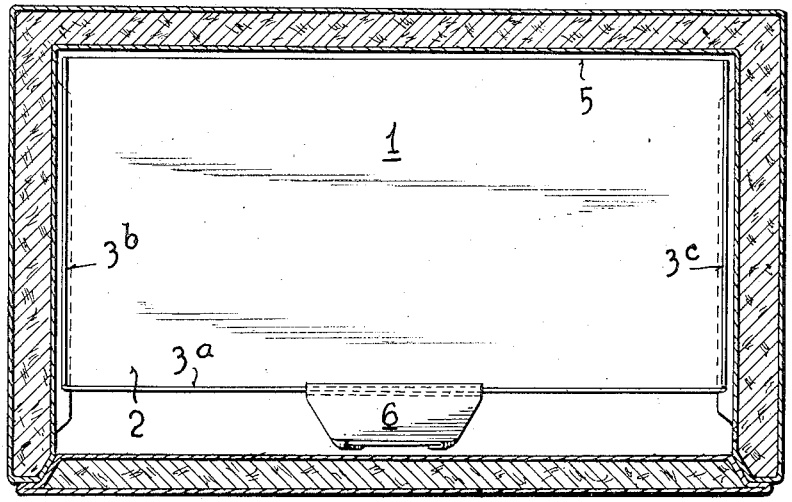
Figure 1 is a horizontal section of an oven showing one of my cookie pans in place within the oven.
Figure 2:
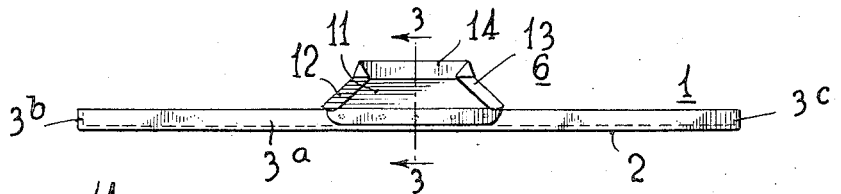
Figure 2 is a front edge elevation of my cookie pan and of the handle attached thereto.

Referring in detail to the drawing, numeral 1 is a piece of sheet material, preferably metal, which forms the body of the pan. The sheet metal 1 is bent to form a flat bottom portion 2 and having upwardly extending flanges 3a, 3b, and 3c bent at substantially right angles and then bent inwardly and downwardly to a point just above the bottom 2 at 4 to form a fold or double ply. The flange is better described as an inverted U-shaped flange. These flanges are formed identically on three sides of the body portion including the front side 3a which carries the handle 6. Opposite to the front side or handle side the pan body is bent over outwardly and folded back against the bottom of the pan body to provide a rounded leading edge 5.

Figure 3:
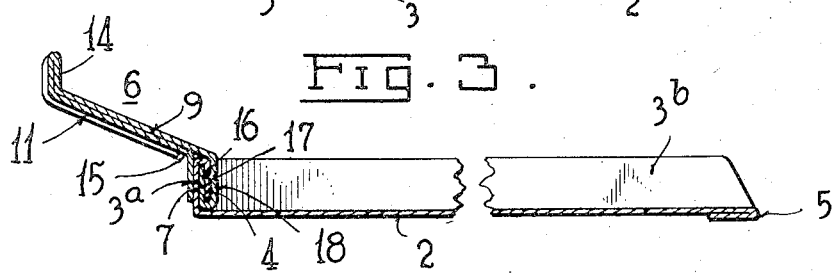
Figure 3 is an enlarged sectional view partly broken away taken along the line 3—3 of Figure 2 of the pan and handle.
Figure 4:
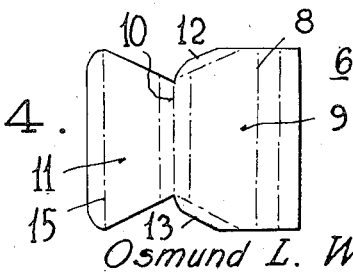
Figure 4 is a plan view of the handle per se with lines to indicate how it is to be folded for attachment with the pan rim or flange.

The handle 6 is folded with the flange 3a so that one portion of the handle as at 7 is folded and held between part 4 and part 3a of the double ply flange. The handle is then bent upwardly parallel with the flange and outwardly over the rounded top of the double ply flange at an angle on line 8 to form a portion 9 having tabs or wings 12 and 13. The handle 6 is bent to form a portion 18 parallel to the folded portion or leg 4 and is punched to form indents 16 which in turn engage with indents 17 in leg portion 4 of the inverted U-shaped flange, thereby making a tight fit at this point. From portion 9 the material is again bent on line 10 (see Figure 4) and part 11 is folded back under portion 9 to the flange 3a (see Figure 3) and then bent downwardly at 15. The handle material extends downwardly from bend 15 substantially parallel with the flange 3a and acts as a brace, thereby relieving much of the strain from the inside connection when lifting the pan by the handle. Wings or tabs 12 and 13 are now folded downwardly from portion 9 onto portion 11 to hold the two portions together. Following this operation the end of the fold is now bent upwardly to form a thumb hold as at 14.

In brief, the handle comprises a piece of sheet material having a low heat conductivity, cut to shape so as to have a portion 9 with integral tabs 12 and 13 and a portion 11 adapted to be folded and held together by the tabs 12 and 13 and bent at point 15 to provide a brace to relieve strain on the inner handle connection. The inner connection being folded between the double ply flange 3a and secured by corresponding indents on the portion 4 and part 18. The handle also has an upward bend at 14 to provide a thumb hold. Midway of the leading edge 5 a hole may be formed in the bottom 2 to hang up the pan or the handle may have a hole formed therein for this purpose.

In operation the pan is slid into the oven or a stove on the usual tracks or guides provided for the oven shelves. Cookie batter is then dropped upon the pans at intervals and left to bake. After the cookies are done the pan is slid out of the oven and tilted over the cookie jar. Cookies will slide off of the pan over the leading edge 5 and without the necessity of handling. If desired, a cookie pan for each pair of tracks may be slid into the oven and double quantities made.

While I have described my invention as applied to a particular type of pan, I wish it understood that I may also employ similar structure in connection with other cooking utensils or containers.

What I claim is:—

1. In combination with a suitable container, a handle comprising a body portion of one piece of sheet material, including a U-shaped leg at one end, a folded flat double ply hand grip portion extending outwardly and upwardly from the U-shaped leg portion, and a brace member extending downwardly from the said folded flat double ply portion at the other end, said container having a flange shaped to cooperate with the said handle.

2. In combination with a suitable container, a handle comprising a body portion of one piece of sheet metal, including a U-shaped leg at one end, a folded flat hand grip portion having upper and lower ply sections extending outwardly and upwardly from the said U-shaped leg portion, means to secure the said upper and lower ply sections together, and a brace member extending downwardly from the lower ply section at the other end of the said body portion, said container having a flange shaped to cooperate with the U-shaped leg and brace member of the said handle.

OSMUND L. WENDEROTH.